United States Patent [19]

Ikeno

[11] Patent Number: 5,163,144

[45] Date of Patent: Nov. 10, 1992

[54] SYSTEM FOR RELEASING ACCESS STATUS OF AN EXTENDED BUFFER MEMORY FROM A DEADLOCK STATE AFTER A PREDETERMINED NUMBER OF LOCKED-OUT ACCESS REQUESTS

[75] Inventor: Motokiyo Ikeno, Tokyo, Japan

[73] Assignee: NEC Corporation, Tokyo, Japan

[21] Appl. No.: 329,274

[22] Filed: Mar. 27, 1989

[30] Foreign Application Priority Data

Mar. 25, 1988 [JP] Japan ................................. 63-69871
Mar. 25, 1988 [JP] Japan ................................. 63-69873

[51] Int. Cl.⁵ .................... G06F 13/14; G06F 13/16
[52] U.S. Cl. ................................ 395/425; 364/228.1;
364/230.6; 364/238.9; 364/242.91; 364/243.1;
364/245.7; 364/266.5; 364/926.6; 364/931.46;
364/941.8; 364/942.7; 364/964.5; 364/969.2;
364/970.5; 364/DIG. 1; 395/725; 395/250
[58] Field of Search ... 364/200 MS File, 900 MS File;
395/425, 725

[56] References Cited

U.S. PATENT DOCUMENTS

| 4,000,485 | 12/1976 | Barlow et al. | 364/900 |
|---|---|---|---|
| 4,365,292 | 12/1982 | Barnes et al. | 364/200 |
| 4,395,753 | 7/1983 | Comfort et al. | 364/200 |
| 4,481,580 | 11/1984 | Martin et al. | 364/200 |
| 4,488,217 | 12/1984 | Binder et al. | 364/200 |
| 4,561,051 | 12/1985 | Rodman et al. | 364/200 |
| 4,574,350 | 3/1986 | Starr | 364/200 |

OTHER PUBLICATIONS

J. C. Daly and J. T. Rodell Time-out/Voting Algorithm for Resource Contention in N-way Multiprocessing Systems IBM Technical Disclosure Bulletin, vol. 26, No. 2 Jul. 1983.

Primary Examiner—Thomas C. Lee
Assistant Examiner—Ken S. Kim
Attorney, Agent, or Firm—Foley & Lardner

[57] ABSTRACT

In an information processing system comprising a main memory device, a plurality of processors, a system controller between the main memory device and the processors, and an extended buffer memory for carrying out a data transfer operation to and from the main memory device, the system controller comprises a communication lock circuit for selectively indicating a locked state and an unlocked state representative of a state of the extended buffer memory. The communication lock circuit is accessed to detect the state of the extended buffer memory each time when either a lock instruction or a lock release instruction is issued from each processor before a data transfer request is delivered from each processor to the extended buffer memory.

2 Claims, 3 Drawing Sheets

SYSTEM FOR RELEASING ACCESS STATUS OF AN EXTENDED BUFFER MEMORY FROM A DEADLOCK STATE AFTER A PREDETERMINED NUMBER OF LOCKED-OUT ACCESS REQUESTS

BACKGROUND OF THE INVENTION

This invention relates to an information processing system which is applicable to a super computer or the like.

Information processing systems, such as a super computers are used to solve a complex problems which require a large scale or amount of scientific and technical calculation. For this purpose, a plurality of processors are included in the information processing system in addition to a main memory device so as to concurrently execute or process jobs. Such concurrent processing enables high speed calculation. The processors may comprise a central processing unit (CPU), a plurality of arithmetic processing units, and an input/output processing unit.

It is a recent trend that such problems are becoming more complicated and require very large scale calculations. Such large scale calculations makes it difficult to store all data for the complex calculations in the main memory device. Under the circumstances, an extended buffer memory of a large memory capacity is usually used in the information processing system to store the data. Therefore, an extended memory data transfer operation is carried out between the main memory device and the extended buffer memory in response to a transfer request which is issued from a selected one of the processors and which may be called an extended memory transfer request. During such an extended memory data transfer operation, the extended buffer memory must be locked so as to avoid collision among extended buffer memory transfer requests issued from the other processors. Such a lock operation will be referred to as a communication lock operation.

It is to be noted that lock information is stored in the main memory device and is accessed by each processor on carrying out the communication lock operation.

In the meanwhile, each of the arithmetic processing units may execute a vector instruction which requires a main memory data transfer operation of vector data to the main memory device to store the data into the main memory. In addition, another main memory data transfer operation may be carried out between the main memory device and the input/output processor. During such main memory data transfer operations between the main memory device and each arithmetic processing unit and between the main memory device and the input/output processor, the main memory device can not be used by the other processors. This shows that the main memory device is not always available to the processors when the extended memory data transfer request is issued to carry out the extended memory data transfer operation between the main memory device and the extended buffer memory. In other words, the main memory device is often in a busy state.

The extended memory data transfer request might be issued from one of the processors during the busy state of the main memory device. In this event, the extended memory data transfer request is inevitably halted without execution until the busy state is released in the main memory device. This shows that the lock information can be neither read out of the main memory device nor released to put the extended buffer memory into an unlocked state until the main memory device is released after completion of the main memory data transfer operation. This gives rise to a reduction of throughput of the information processing system.

U.S. patent application Ser. No. 290,623 filed Dec. 24, 1987, by Akira Jippo and assigned to the present assignee, proposed an information processing system which comprises a central processing unit (CPU), a plurality of arithmetic processors, an input/output processor, and a system controller and which can deal with transfer requests simultaneously produced from the CPU, the arithmetic processors, and the input/output processor. To this end, a transfer controlling arrangement is included in the system controller. However, no consideration is made about processing carried out when the main memory device is put into a busy state.

SUMMARY OF THE INVENTION

It is an object of this invention to provide an information processing system which can improve throughput even when a main memory device is put into a busy state.

It is another object of this invention to provide an information processing system which can immediately monitor lock information by detecting the state of an extended buffer memory regardless of the state of the main memory device.

An information processing system to which this invention is applicable comprises main memory means for memorizing data, a plurality of processors for processing the data read out of the main memory means, an extended buffer memory operable to carry out a data transfer operation to and from the main memory means, and a system processing device intermediate between the processors and the main memory means and operable in cooperation with the extended buffer memory. Each of the processors delivers, to the system processing device, a data transfer request indicative of the data transfer operation between the main memory means and the extended buffer memory. The extended buffer memory is kept during the data transfer operation into a locked state of inhibiting an access operation to the extended buffer memory. Each of the processors produces, prior to production of the data transfer request, a lock instruction of locking the extended buffer memory into the locked state. According to this invention, the system processing device comprises state signal producing means responsive to the lock instruction issued from each of the processors for producing a locked state signal representative of the locked state and, otherwise, for producing an available state signal representing that the extended buffer memory is available and supplying means for supplying each of the locked and the available state signals to each of the processors.

DESCRIPTION OF THE PREFERRED EMBODIMENTS

Figure 1:
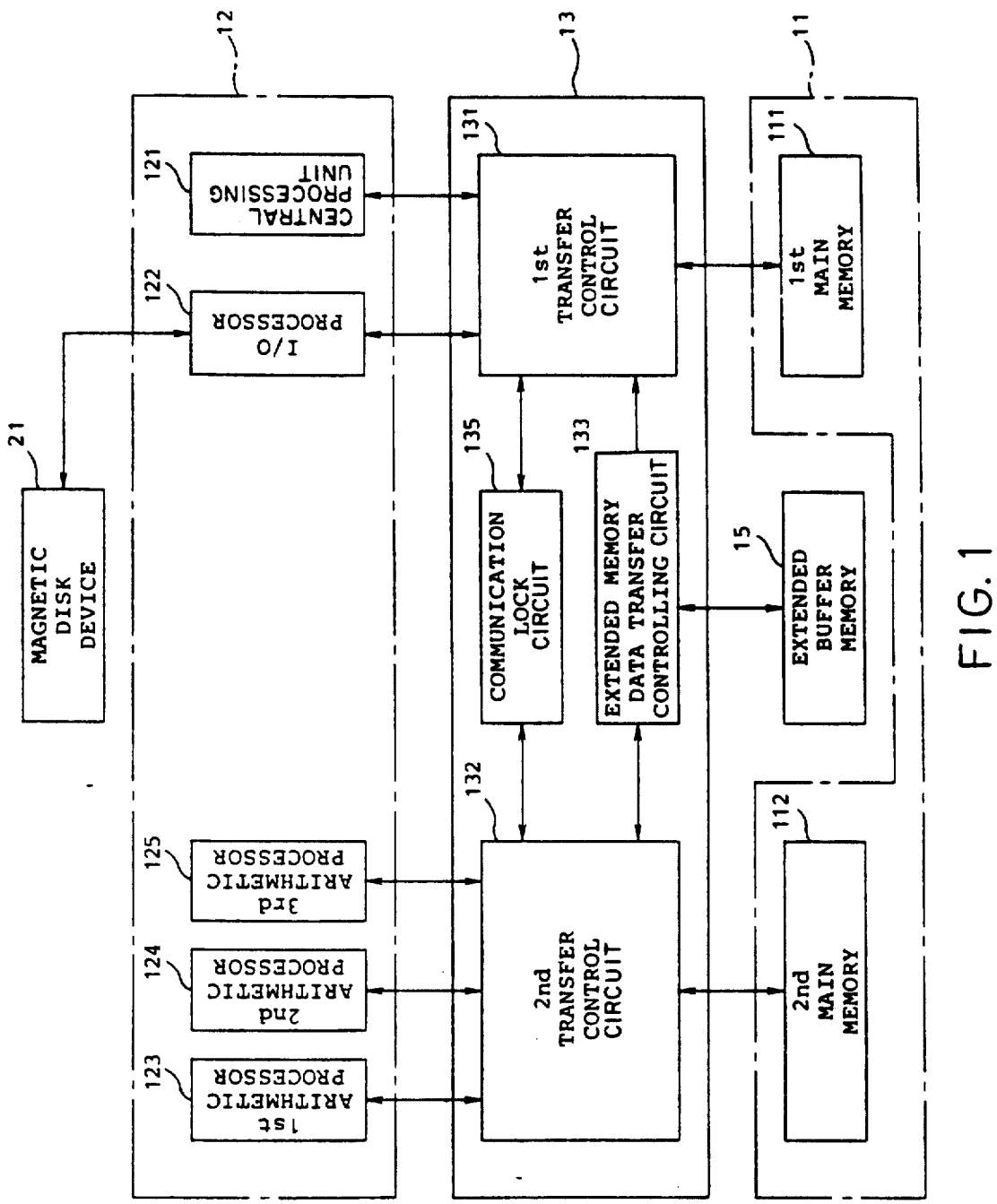
FIG. 1 is a block diagram of an information processing system according to a preferred embodiment of this invention.

Referring to FIG. 1, an information processing system according to a preferred embodiment of this invention comprises a main memory device 11, a processor section 12, and a system controller 13 intermediate between the main memory device 11 and the control section 12. In addition, an extended buffer memory 15 is coupled to the system controller 13 to carry out data transfer operations to and from the main memory device 11 in a manner to be described later.

More specifically, the illustrated processor section 12 comprises a central processing unit (CPU) 121, an input/output (I/O) processor 122, and first through third arithmetic processors which are depicted at 123, 124, and 125, respectively. The input/output processor 122 is connected to an external memory device specified by a magnetic disk device 21 in FIG. 1. The central processing unit 121 controls a whole of the illustrated information processing system in accordance with control programs while each of the first through third arithmetic processors 123 to 125 executes user programs. In the example being illustrated, each arithmetic processor 123 to 125 is assumed to mainly carry out vector calculations. The arithmetic processors may be equal in number to unity.

On the other hand, the main memory device 11 comprises first and second main memories 111 and 112 which may be called controlling and calculating main memories, respectively. The first main memory 111 is controlled by the control programs to be used by the central processing unit 121. The second main memory 112 stores vector data for the vector calculations and the user programs for the arithmetic processors 123 to 125 and are therefore used by the first through third arithmetic processors 123 to 125. In this connection, the second main memory 112 has a large memory capacity and functions at a very high speed.

The system controller 13 is located between the main memory device 11 and the processor section 12 and comprises a first transfer control circuit 131 for controlling a data transfer between either the first or the second main memory 111 or 112 and whichever of the central processing unit 121, the input/output processor 122, and the second main memory 112. A second transfer control circuit 132 is for controlling a data transfer between either one of the first through third arithmetic processors 123 to 125 and either the second or the first main memory 112 or 111.

In addition, the system controller 13 comprises an extended memory data transfer controlling circuit 133 connected to the first and the second transfer control circuits 131 and 132 and the extended buffer memory 15. The extended memory data transfer controlling circuit 133 is for controlling a data transfer between the extended buffer memory 15 and the first main memory 111 and between the extended buffer memory 15 and the second main memory 112. The extended memory data transfer controlling circuit 133 is similar in structure and operation to that illustrated in the above-referenced copending United States Application and will therefore not be described any longer. Moreover, the illustrated system controller 13 comprises a communication lock circuit 135 which is coupled through both the first and the second transfer control circuits 131 and 132 to the central processing unit 121, the input/output processor 122, and the first through third arithmetic processors 123 to 125. The communication lock circuit 135 functions in a manner to be described later. For the time being, it may be understood that the communication lock circuit 135 can receive a lock instruction or a lock release instruction issued from each of the central processing unit 121, the first through third arithmetic processors 123 to 125, and the input/output processor 122.

Figure 2:
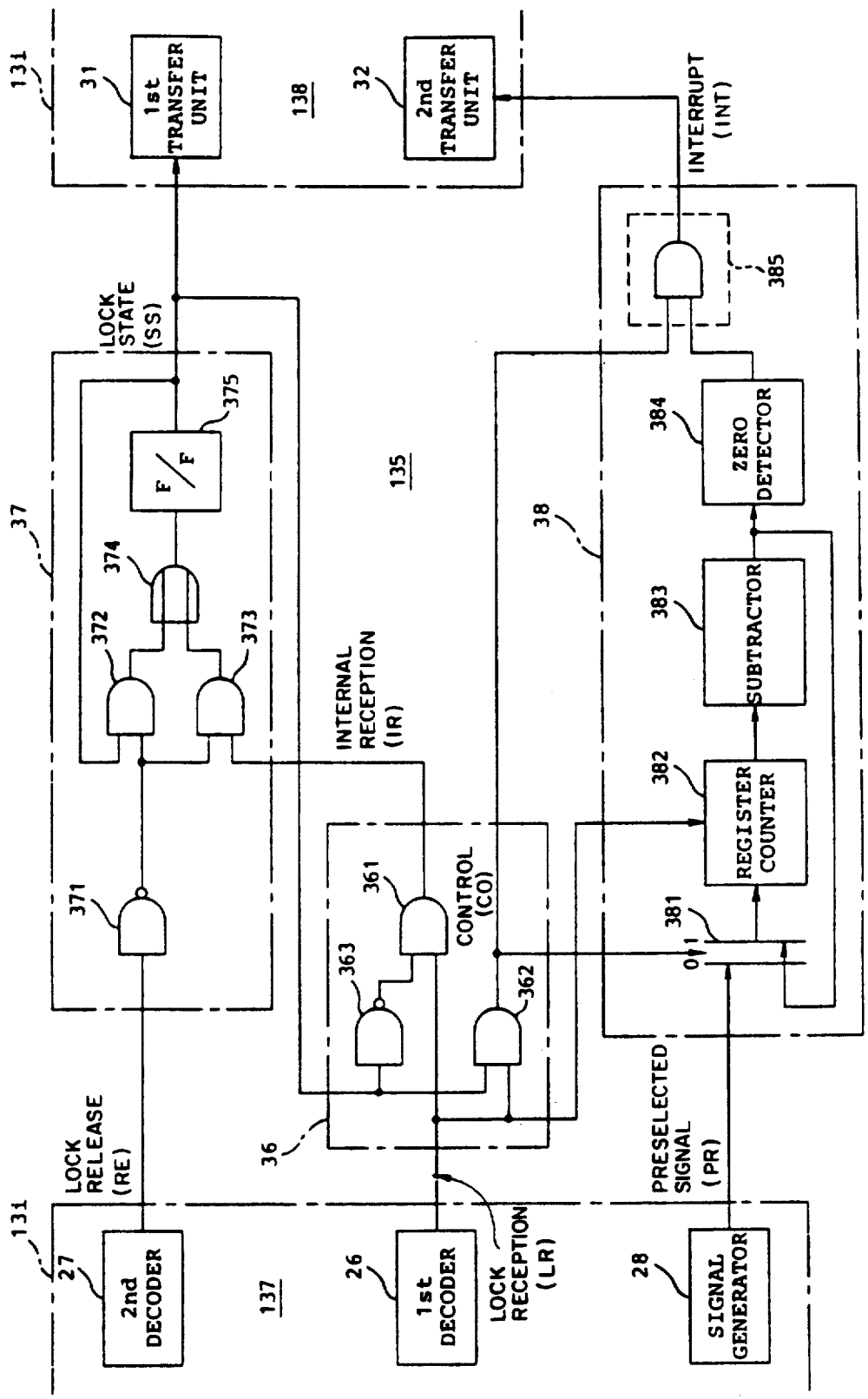
FIG. 2 is a block diagram of a communication lock circuit used in the information processing system illustrated in FIG. 1.

Referring to FIG. 2 together with FIG. 1, the communication lock circuit 135 functions in cooperation with both the first and the second transfer control circuits 131 and 132 only one of which is illustrated in FIG. 2 and which may be recognized as the first or the second transfer control circuit 131 or 132. The illustrated transfer control circuit may be therefore depicted at 13i and comprises an input section 137 and an output section 138. The input section 137 of the transfer control circuit 13i is specified by first and second decoders 26 and 27 and a signal generator 28 which are all connected to the central processing unit 121, the input/output processor 122, and the first through third arithmetic processors 123 to 125, although not shown in this figure for simplicity of illustration. The first decoder 26 operates in response to the lock instruction given from each of the central processing unit 121, the first through third arithmetic processors 123 to 125 and the input/output processor 122 (which will simply be called processor) to produce the lock reception signal LR of a logic "1" level while the second decoder 27 operates in response to the lock release instruction sent from each processor to produce a lock release signal RE of the logic "1" level. In addition, the signal generator 28 is enabled to produce a preselected signal PR in response to a specific signal delivered from each processor in a manner to be described later.

On the other hand, the output section 138 of the transfer control circuit 13i is represented by first and second signal transfer units 31 and 32 which are connected to all of the central processing unit 121, the input/output processor 122, and the first through third arithmetic processors 123 to 125.

At any rate, the communication lock circuit 135 is accessed to indicate whether the extended buffer memory 15 is locked before each of the central processing unit 121, the first through third arithmetic processors 123 to 125, and the input/output processor 122 produces a data transfer request, requesting a data transfer operation between the extended buffer memory 15 and the first and the second main memories 111 and 112. Such a data transfer request and a data transfer operation may be referred to as an extended buffer transfer request and an extended buffer data transfer operation, respectively. Herein, the extended buffer memory 15 is put into a locked state during the extended buffer data transfer operation and is, otherwise, put into an available or unlocked state.

It is to be noted that the communication lock circuit 135 is located within the system processor 13 to selectively indicate the locked state and the unlocked state of the extended buffer memory 15. To this end, the communication lock circuit 135 comprises a lock detection circuit 36 connected to the first decoder 26 of the input section 137, a lock flag circuit 37 connected to the third decoder 28, and a dead lock detection circuit 38 connected to the signal generator 28.

Now, the lock flag circuit 37 produces a logic "0" level signal as an available signal when the extended buffer memory 15 is kept at the unlocked state while no extended buffer data transfer operations are occurring in the extended buffer memory 15. Otherwise, a logic "1" level signal is produced as a locked state signal representative of the locked state. Thus, the available signal and the locked state signal will be collectively called a state signal or a state flag depicted at SS in FIG. 2 and are selectively sent to the first transfer circuit 31 to be produced through the first transfer unit 31 as a reply signal.

It is assumed that the illustrated lock flag circuit 37 produces the available signal of the logic "0" level. The available signal is delivered from the lock flag circuit 37 to the lock detection circuit 36 which is connected to the first decoder 26. Under the circumstances, it is also assumed that the first decoder 26 is supplied with the lock instruction from a selected one of the central processing unit 121, the first through third arithmetic processors 123 to 125, and the input/output processor 122 that may be called a processor in question. In this event, the first decoder 26 delivers the lock reception signal LR of the logic "1" level to the lock detection circuit 36.

The lock detection circuit 36 comprises a first AND gate 361, a second AND gate 362, and an inverter 363. The lock reception signal LR is supplied from the first decoder 26 to both the first and the second AND gates 361 and 362 while the state signal SS is delivered from the lock flag circuit 37 to the inverter 363 and the second AND gate 362 connected to the dead lock circuit 38 operable in a manner to be described later. With this structure, the first AND gate 361 is opened through the inverter 363 to produce an internal reception signal IR of the logic "1" level when the state signal SS and the lock reception signal LR take the logic "0" level and the logic "1" level, respectively.

The lock flag circuit 37 comprises an inverter 371 connected to the second decoder 27, a pair of AND gates 372 and 373 connected to the inverter 371, an OR gate 374 connected to the AND gates 372 and 373, and a flip-flop 375 connected to the OR gate 375. An output signal of the flip-flop 375 is sent as the state signal SS to the first transfer circuit 131 and returned back to the AND gate 372 while the internal reception signal IR is supplied to the AND gate 373. Responsive to the internal reception signal IR, the flip-flop 375 is put into a set state as long as the flip-flop 375 is previously put into a reset state without reception of the lock release signal RE from the second decoder 27. As a result, the state signal SS is changed from the logic "0" level to the logic "1" level. During production of the available signal of the logic "0" level, the first transfer unit 131 delivers the reply signal to the processor in question. Such delivery of the reply signal shows that the extended buffer memory 15 is successfully locked in response to the lock instruction issued by the processor in question. Thereafter, the logic "1" level is sent as the locked state signal from the flip-flop 375 and is delivered to another processor to indicate a locked state of the extended buffer memory 15 when another processor issues a following lock instruction.

It is mentioned here that each processor illustrated in FIG. 1 produces the specific signal simultaneously with the lock instruction. Such a specific signal is given to the signal generator 28 illustrated in FIG. 2. Supplied with the specific signal, the signal generator 28 sends the preselected signal PR of m bits to the dead lock detection circuit 38. Such a preselected signal may be directly given from each processor to the dead lock detection circuit 38. In this case, the signal generator 28 may be a register circuit. At any rate, all of m bits of the preselected signals take the logic "1" levels, respectively, and are produced in parallel from the signal generator 28, although a single line alone is illustrated in FIG. 2.

In FIG. 2, the dead lock detection circuit 38 comprises a selector 381 connected to the second AND gate 362 of the lock detection circuit 36, a register counter 382 supplied with the lock reception signal LR from the first decoder 26, a subtractor 383 connected to the register counter 382, a zero detector 384 connected to the subtractor 383, and an interruption circuit 385 formed by an AND gate. The subtractor 383 is also connected to the selector 381 to supply a subtraction output signal to the selector 381. The selector 381 and the interruption circuit 385 are supplied from the second AND gate 362 with a control signal CO of the logic "1" level when the lock reception signal LR of the logic "1" level with the state signal SS of the logic "1". level sent from the lock flag circuit 37. This means that the control signal CO takes the logic "1" level when the locked state signal is produced as the state signal SS by the flip-flop 375. In other words, the control signal CO of the logic "1" level appears when the extended buffer memory 15 fails to become locked in response to the lock instruction and is therefore indicative of failure of lock operation of the extended buffer memory 15. The selector 381 selects the preselected signal PR and the subtractor output signal when the control signal CO takes the logic "0" and the logic "1" levels, respectively.

Figure 3:
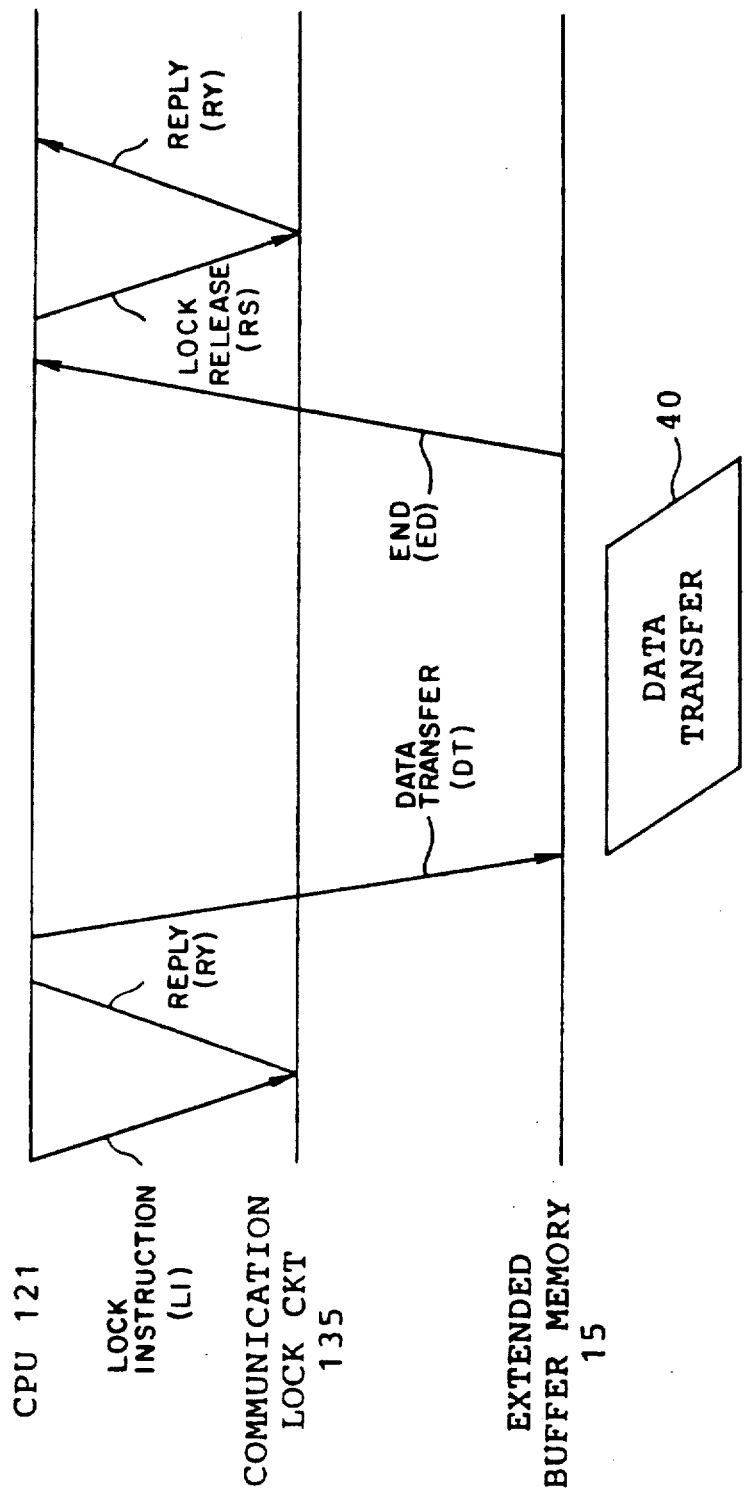
FIG. 3 is a time chart for use in describing operation of the information processing system illustrated in FIGS. 1 and 2.

Referring to FIG. 3, FIGS. 1 and FIG. 2, the operation of the information processing system illustrated in FIGS. 1 and 2 will be described. When the central processing unit 121 issues the lock instruction depicted at LI in FIG. 3 to indicate an extended buffer data transfer operation between the extended buffer memory 15 and the first main memory 111. In this connection, the lock instruction is issued from the central processing unit 121 together with the specific signal prior to production of an extended buffer data transfer request. The lock instruction LI is received by the first decoder 26 (FIG. 2) of the first transfer control circuit 131. Responsive to the lock instruction LI, the first decoder 26 delivers the lock reception signal LR of the logic "1" level to the lock detection circuit 36 (FIG. 2) of the communication lock circuit 135. When the extended buffer memory 15 is kept in the unlocked state, the state signal SS takes the logic "0" level to indicate the available state of the extended buffer memory 15. The state signal SS of the logic "0" level is sent through the first transfer unit 31 of the first transfer control circuit 131 to the central processing unit 121 as the reply signal depicted at RY in FIG. 3. Responsive to the reply signal RY, the central processing unit 121 recognizes the available or unlocked state of the extended buffer memory 15.

Under the circumstances, the first AND gate 361 is opened to produce the logic "1" level while the second AND gate 362 is closed to produce the control signal CO of the logic "0" level. Therefore, the internal reception signal IR is sent from the first AND gate 361 to the AND gate 373 of the lock flag circuit 37. Inasmuch as no lock release signal RE is produced from the second decoder 27 in the absence of the lock release instruction, the logic "1" level signal is given from the second decoder 27 to the AND gates 372 and 373 through the inverter 371. Consequently, the flip-flop 375 is set through the AND gate 373 and the OR gate 374 and produces the state signal SS of the logic "1" level to specify the locked state of the extended buffer memory 15. Such a locked state is transmitted to other processors in response to following ones of the lock instructions issued from the other processors. Thus, each processor can recognize the states of the extended buffer memory 15 without any access operation of each processor to the first and the second main memories 111 and 112. Therefore, the lock instruction LI can be quickly processed in each processor even when the first and the second main memories 111 and 112 are kept at busy states.

In addition, the preselected signal PR of m bits is delivered from the signal generator 28 to the register counter 382 through the selector 381 in response to the specific signal sent from the central processing unit 121 and is kept in the register counter 382 in synchronism with the lock reception signal LR. This is because the selector 381 is supplied with the control signal CO of the logic "0" level. Operation of the subtractor 383, the zero detector 384, and the interruption circuit 385 will be described in detail later.

In FIG. 3, the central processing unit 121 issues the extended buffer data transfer request which is followed by a start address and a block length related to the extended buffer data transfer operation. A combination of the above-mentioned request, the start address, and the block length may be collectively called a data transfer instruction DT.

The extended buffer data transfer instruction DT is delivered to the extended memory data transfer controlling circuit 133 through the first transfer control circuit 131 in a known manner. Subsequently, an extended buffer transfer operation is carried out between the first main memory 111 and the extended buffer memory 15, as shown at 40 in FIG. 3. When the data transfer operation 40 is completed between the first main memory 111 and the extended buffer memory 15, the extended memory data transfer controlling circuit 133 supplies the central processing unit 121 through the first transfer control circuit 131 with an end signal ED to indicate completion of the data transfer operation.

Responsive to the end signal ED, the central processing unit 121 issues the lock release instruction (depicted at RS) which is sent to the second decoder 27 (FIG. 2) of the first transfer control circuit 131. Given the lock release instruction RS, the second decoder 27 sends the lock release signal RE of the logic "1" level to the inverter 371 of the lock flag circuit 37 to reset the flip-flop 375. Thus, the state signal SS becomes the logic "0" level to indicate the available state of the extended buffer memory 15. The state signal SS of the logic "0" level is returned as the reply signal RY back to the central processing unit 121 through the first transfer unit 31.

The communication lock circuit 135 receives the lock release instruction RS or signal RE, like in reception of the lock instruction, even when the first main memory 111 is being carrying out a data transfer operation between the magnetic disk device 21 and the first main memory 111 under control of the input/output processor 122.

Similar operation can be carried out when the lock instruction LI or the lock release instruction RS is issued from each of the arithmetic processors 123 to 125 and the input/output processor 122 and is received by the communication lock circuit 135 even when the first and the second main memories 111 and 112 are being carrying out data transfer operation. This means that the lock instruction LI or the lock release instruction RS can be executed without an access operation to the first and the second main memories 111 and 112.

In FIGS. 1 and 2, the lock instruction LI may be issued from either the central processing unit 121, the arithmetic processors 123 to 125, or the input/output processor 122 and may be referred to as a request source processor. When the locked state signal of the logic "1" level is already being produced as the state signal SS from the lock flag circuit 37, and a lock instruction (LI) is issued. In this event, no internal reception signal IR is given from the lock detection circuit 36 to the lock flag circuit 37 and the control signal CO of the logic "1" level is delivered from the lock detection circuit 36 to the selector 381 and the interruption circuit 385 of the dead lock detection circuit 38. In this event, the register counter 382 is assumed to be loaded with the preselected signal PR of the m bits each of which takes the logic "1" level. Thus, the register counter 382 indicates a value of $2^m$. Responsive to the lock reception signal LR, the register counter 382 sends the value of $2^m$ to the subtractor 383 which subtracts unity from the value given from the register counter 382. Such subtraction is successively carried out each time when the control signal CO of the logic "1" level is supplied from the lock detection circuit 36 to the selector 381. When the subtraction is carried out $(2^m-1)$ times in response to the lock reception signal LR, the subtraction output signal becomes equal to zero with the counter register 382 kept at unity. The zero detector 384 detects a zero state of the subtractor 383 to produce a zero state signal of the logic "1" level. The zero state signal is sent to the AND gate of the interruption circuit 385 together with the control signal CO. Accordingly, the interruption circuit 385 delivers an interruption signal INT of the logic "1" level to the second transfer circuit 32 of the transfer control circuit 13i. The interruption signal INT is representative of a dead lock state in the extended buffer memory 15. From this fact, it is readily understood that the interruption signal INT is sent back to the request source processor when the lock instruction LI is not received by the lock detection circuit 36 $(2^m-1)$ times.

Responsive to the interruption signal INT, the request source processor supplies the lock release instruction RS to the second decoder 27. As a result, the state signal SS is forcibly reset into the logic "0" level.

While this invention has thus far been described in conjunction with a preferred embodiment thereof, it will readily be possible for those skilled in the art to put this invention into practice in various other implementations. For example, the main memory device 11 may comprise a single main memory. The lock communication circuit 135 may control the lock instruction and the lock release instruction only among the arithmetic processors, regardless of the central processing unit. In any event, each processor can execute the lock instruction and the lock release instruction by locating the lock flag circuit 37 in the system controller 13 even when the main memory device is put into a busy state. This shows that it is possible to quickly recognize the state signal representative of the extended buffer memory 15.

What is claimed is:

1. An information processing system comprising:
main memory means for memorizing data;

a plurality of processors for processing the data read out of said main memory means;

extended buffer memory operable to carry out a data transfer operation to and from said main memory means; and a system processing device intermediate between said processors and said main memory means and operable in cooperation with said extended buffer memory, each of said processors delivering to said system processing device, a data transfer request indicative of said data transfer operation between said main memory means and said extended buffer memory, said extended buffer memory being kept during the data transfer operation in a lock state of inhibiting an access operation to said extended buffer memory, each of said processors producing prior to production of the data transfer request, a lock instruction for locking of said extended buffer memory into said locked state, said processors further producing a lock release instruction for releasing said locked state of said extended buffer memory into a locked release state, said system processing device comprising:

interface means coupled to said processor and responsive to said lock instruction and said lock release instruction for producing a lock reception signal and a lock release signal indicative of reception of said lock instruction and said lock release instruction, respectively;

state signal producing means coupled to said interface means for producing a locked state signal indicative of said locked state of the extended buffer memory when said lock release signal is not received and, otherwise, an available state signal representing that said extended buffer memory is available;

signal generating means for generating a predetermined number signal which is representative of a predetermined number set by each processor;

detecting means coupled to said interface means, said signal generating means and said state signal producing means for detecting whether or not said lock reception signal is received a predetermined number of times represented by said predetermined number signal to produce an interruption signal for interrupting said locked state in the extended buffer memory when said lock reception signal is received said predetermined number of times;

said interface means comprising:

means for delivering said interruption signal to said extended buffer memory to forcibly and automatically release said lock state of the extended buffer memory.

2. An information processing device as claimed in claim 1, wherein said detecting means comprises:

holding means coupled to said interface means for holding a predetermined value representative of said predetermined number signal when said lock reception signal is produced;

subtracting means coupled to said holding means for subtracting unity from said predetermined value to produce a result of the subtraction each time when the lock instruction corresponding to said lock reception signal is not executed; and means coupled to said subtracting means for producing said interruption signal when said result of subtraction is equal to zero.

* * * * *